F. F. PULVER.
FILM WINDING MECHANISM FOR CAMERAS.
APPLICATION FILED JAN. 6, 1919.
1,311,996.
Patented Aug. 5, 1919.
5 SHEETS—SHEET 1.
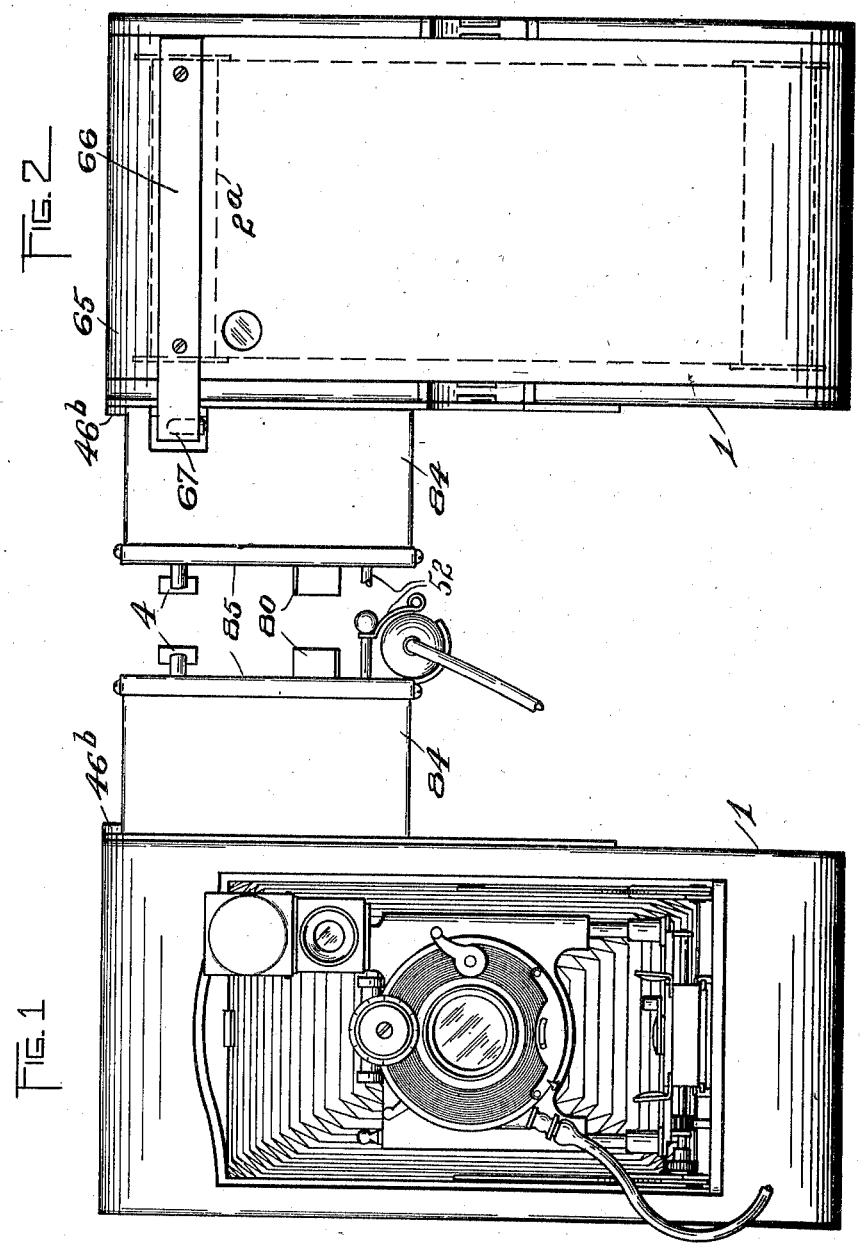
INVENTOR
Frank F. Pulver
BY
Davis & Timms
his ATTORNEYS F. F. PULVER.
FILM WINDING MECHANISM FOR CAMERAS.
APPLICATION FILED JAN. 6, 1919.
1,311,996.
Patented Aug. 5, 1919.
5 SHEETS—SHEET 2.
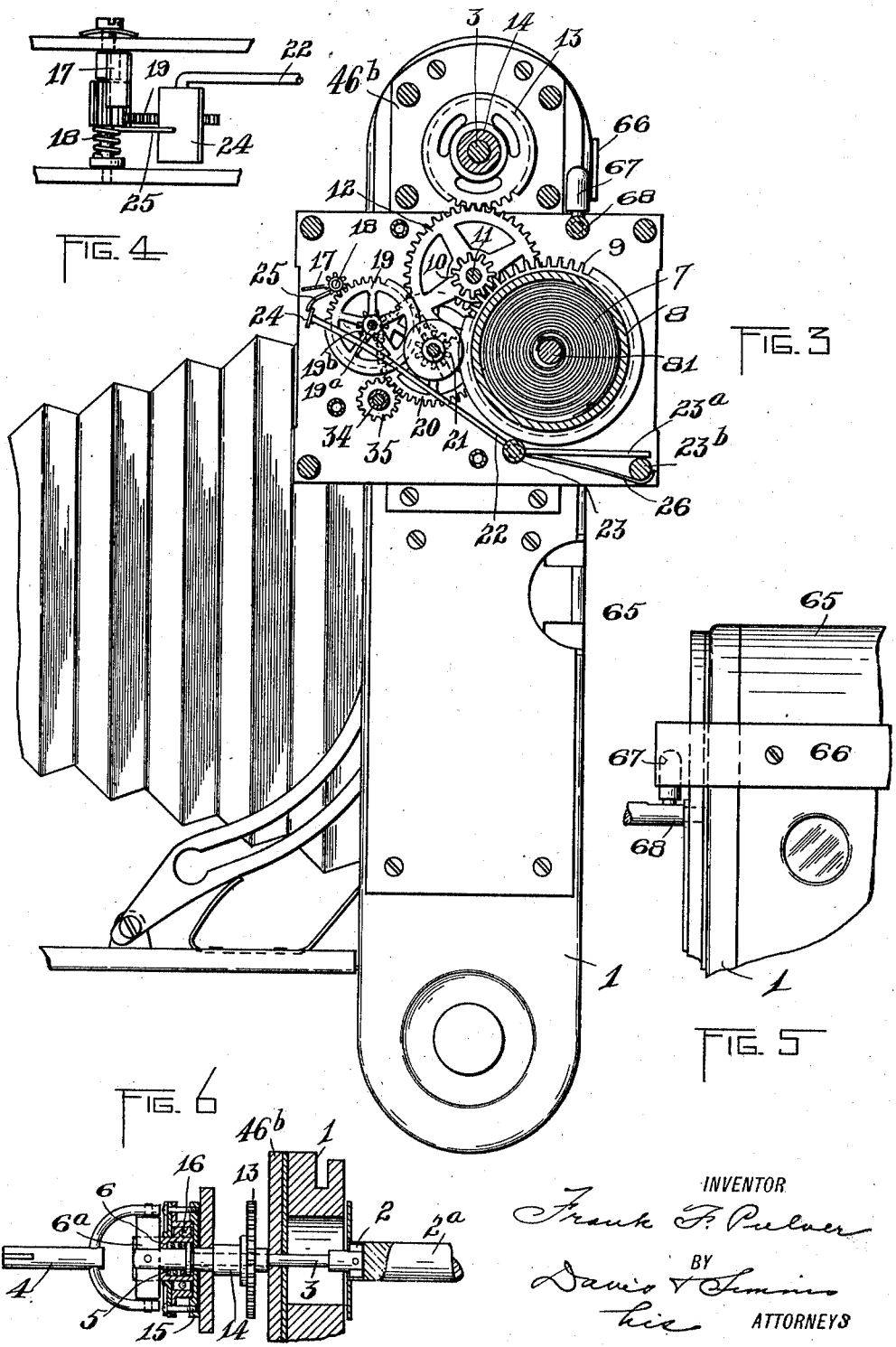
INVENTOR
Frank F. Pulver
BY
Davis & Simms
his ATTORNEYS F. F. PULVER.
FILM WINDING MECHANISM FOR CAMERAS.
APPLICATION FILED JAN. 6, 1919.
1,311,996.
Patented Aug. 5, 1919.
5 SHEETS—SHEET 3.
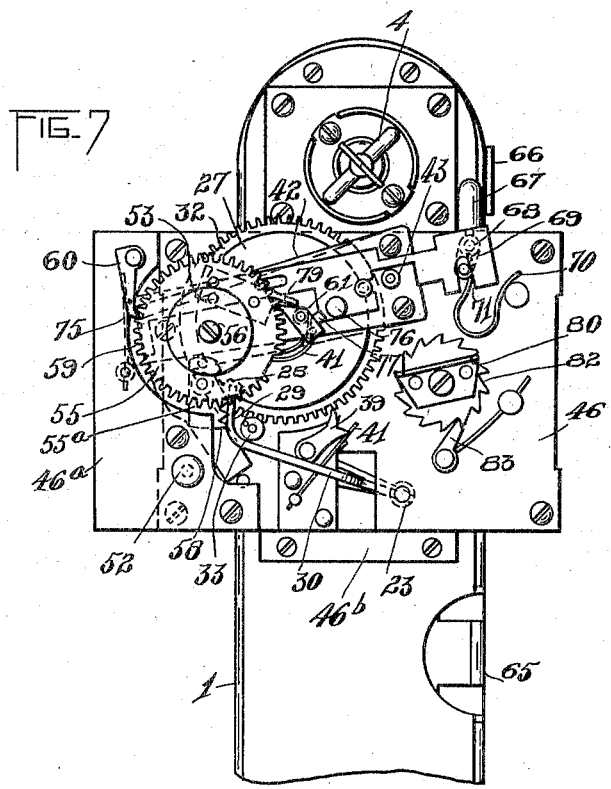
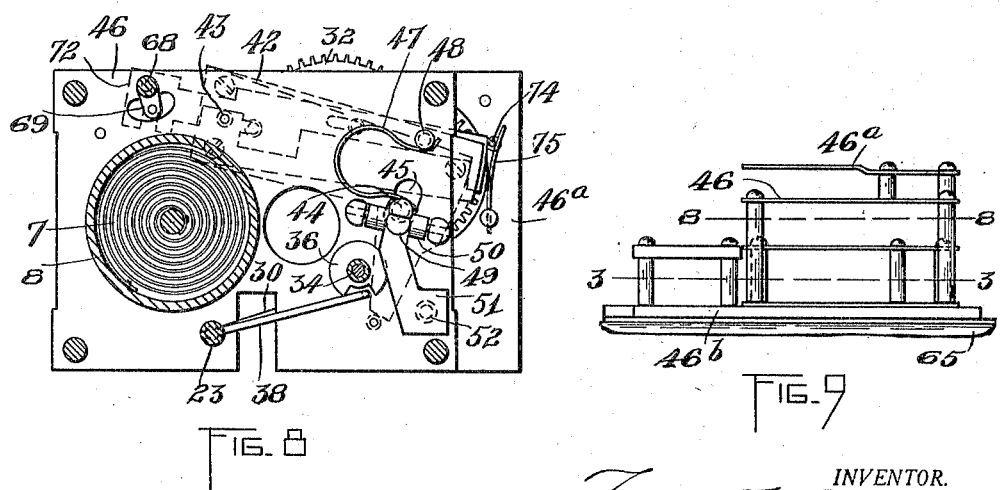
INVENTOR.
Frank F. Pulver
BY
Davis & Simms
his ATTORNEYS.

F. F. PULVER.
FILM WINDING MECHANISM FOR CAMERAS.
APPLICATION FILED JAN. 6, 1919.
1,311,996.
Patented Aug. 5, 1919.
5 SHEETS—SHEET 4.
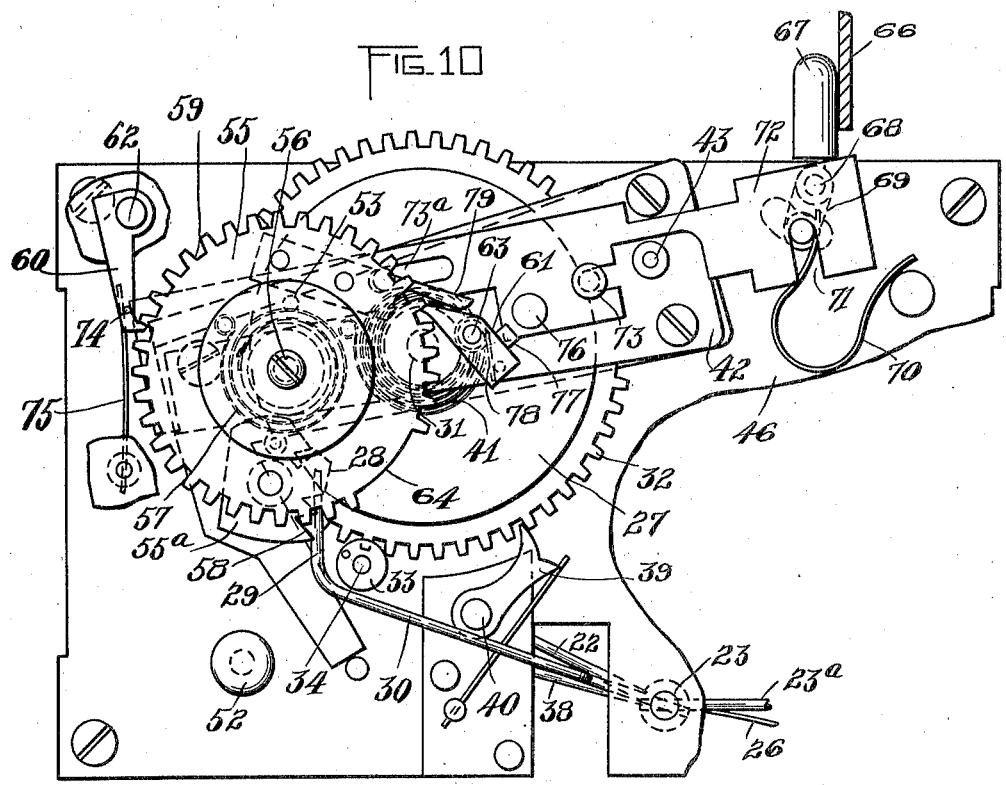
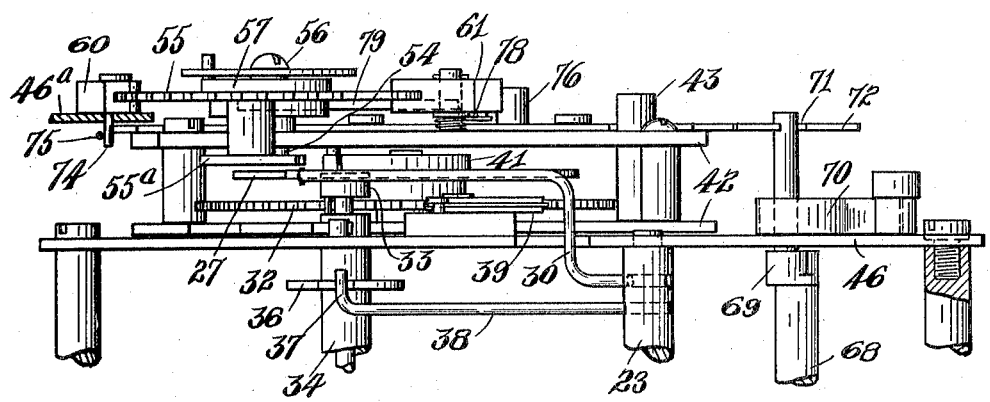
INVENTOR
Frank F. Pulver
BY
Davis & Simms
his ATTORNEYS F. F. PULVER.
FILM WINDING MECHANISM FOR CAMERAS.
APPLICATION FILED JAN. 6, 1919.
1,311,996.
Patented Aug. 5, 1919.
5 SHEETS—SHEET 5.
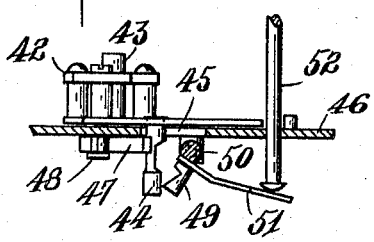
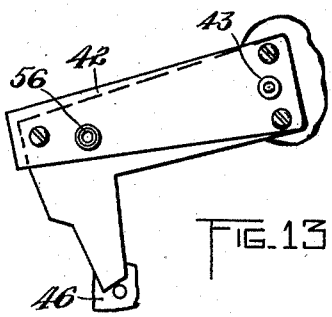
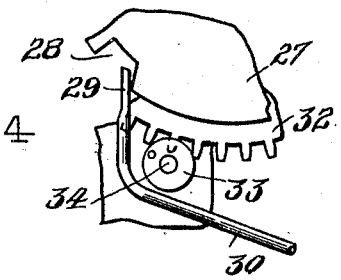
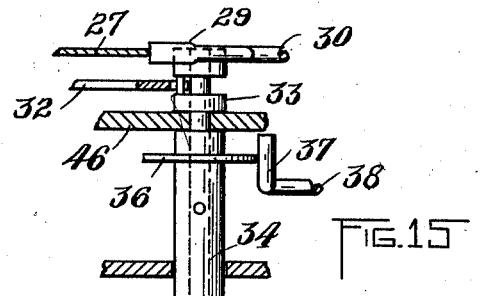
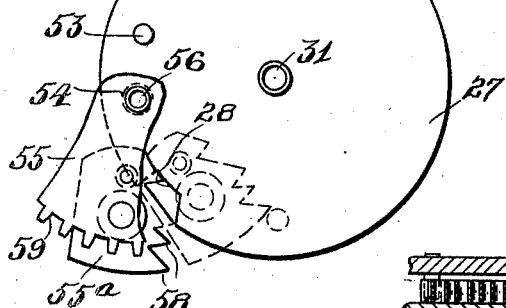
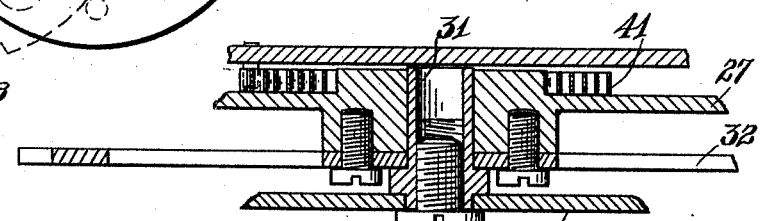
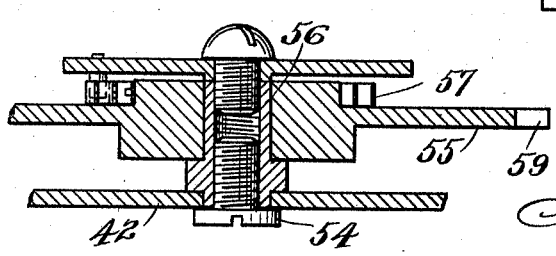
INVENTOR
Frank F. Pulver.
BY
Davis & Simms
his ATTORNEYS

UNITED STATES PATENT OFFICE.

FRANK F. PULVER, OF ROCHESTER, NEW YORK, ASSIGNOR OF ONE-HALF TO LIBBIE H. PULVER, OF ADAMS BASIN, NEW YORK.

FILM-WINDING MECHANISM FOR CAMERAS.

1,311,996.  Specification of Letters Patent.  Patented Aug. 5, 1919.

Application filed January 6, 1919. Serial No. 269,870.

*To all whom it may concern:*

Be it known that I, FRANK F. PULVER, a citizen of the United States, and resident of Rochester, in the county of Monroe and State of New York, have invented certain new and useful Improvements in Film-Winding Mechanisms for Cameras, of which the following is a specification.

The present invention relates to film winding mechanisms for cameras and more particularly to the type in which a motor is released after each picture is taken so that a new portion of a film is presented to the exposure lens of a camera, an object of this invention being to provide an improved construction in which a stop for the motor is effectively controlled so that an equal amount of film is shifted after each exposure notwithstanding the increased diameter of the film on the film spool.

To this and other ends the invention consists of certain parts and combinations of parts all of which will be hereinafter described, the novel features being pointed out in the appended claims.

In the drawings:—

Figure 1 is a front view of a camera equipped with the present invention;

Fig. 2 is a rear view of the same camera;

Fig. 3 is a fragmentary side view of the camera and shows in plan view the film winding mechanism adjacent the base plate of the supporting frame, such frame being shown in section as along the line 3—3 of Fig. 9;

Fig. 4 is a detail view showing the stop or detent coöperating with the governor of the motor;

Fig. 5 is a detail view showing the resetting connection between the camera back and the film winding mechanism;

Fig. 6 is a detail view showing the connection between the motor and the spool shaft;

Fig. 7 is a top plan view of the film winding mechanism, and illustrating particularly the controlling member for the motor stop or detent and the manner in which the movement of the controller is varied;

Fig. 8 is a sectional view of the supporting frame as along the line 8—8, Fig. 9, and shows in bottom plan view the parts of the film winding mechanism above such line;

Fig. 9 is an end view from the left with respect to Figs. 3 and 7, of the frame on which the parts are supported;

Fig. 10 is an enlarged detail view of some of the parts shown in Fig. 7;

Fig. 11 is a side view of the parts shown in Fig. 10;

Fig. 12 is a detail view of the devices for shifting the controlling member for the motor stop;

Fig. 13 is a detail view showing the manner in which the swinging frame stops against the main frame;

Fig. 14 is a detail view showing the parts of the controller connecting with the motor and the motor stop;

Fig. 15 is a detail view of the connection between the motor and the controller for the motor stop;

Fig. 16 is a detail view showing the manner in which the controller is stopped in different positions;

Fig. 17 is a detail sectional view of the controller; and

Fig. 18 is a detail sectional view of the stop member for the controller.

Referring more particularly to the drawings, 1 indicates a roll film camera of the type in which the film is unwound from one spool and wound upon another spool to bring successive portions of the film to the exposure field of the camera. This camera is provided with the usual film winding key 2, which is adapted to be received within the slot of one of the spools $2^a$ for the purpose of turning said spool to wind the film thereon, as is usual in cameras of this type. This key has a shaft 3 which is axially movable for the purpose of bringing the key into and out of the slot of the spool for the insertion or removal of the spool, this shaft having at its outer end a finger piece 4 by which the key may be turned or moved axially. A spring 5 is arranged within a head member 6 and abuts at one end against the shaft, while the other end engages the member 6 for the purpose of holding the key 2 in its innermost position.

The key is adapted to be driven by a motor which, in this instance, is in the form of a spring 7 arranged within a drum 8 connected to a gear 9. This gear meshes with the pinion 10 on a shaft 11 which also carries a gear 12, the latter gear meshing with a gear 13 on a sleeve 14 which is fixed at one end to a casing 15 having connection, by means of a clutch 16 of any preferred type, to the head member 6. A feather and slot connection 6ª causes the member 6 to rotate with the shaft 3 but permits an axial movement of the latter, with reference to the gear 13, for the purpose of withdrawing the key from the spool, as previously set forth; while the clutch 16 permits the shaft 3 to be rotated in one direction independently of the gear 13 so that the key may be turned to be properly positioned with reference to the slot in the film spool, and to wind the remaining portion of the backing sheet on the spool after all exposures have been made. The motor may be provided with a governor, which is, in this instance, in the form of a fan blade 17 on a shaft 18 which is geared to a gear wheel 19 fixed on a shaft 19ª, the latter, in turn, having connection by a pinion 19ᵇ to a gear wheel 20 which, by a pinion 21, connects with the gear wheel 12. The motor is also provided with a suitable stop or detent which, in this instance, comprises an arm 22 pivoted at 23 and having its end 24 movable into and out of the path of a spring arm 25 on the shaft of the fan blade 17. A spring 26 acts on the shaft 23 to normally hold the end 24 of the stop arm 22 in the path of the arm 25 on the fan blade 17. An arm 23ª is provided on the shaft 23 to coöperate with a rod 23ᵇ in order to limit the swinging movement of the shaft 23 under the action of the spring 26.

A controller for the stop mechanism may be provided and comprises, in this instance, a circular disk 27 having a notch 28 in its periphery. This disk coöperates with the end 29 of an arm 30 which extends from the shaft 23, it being apparent that when the end 29 lies within the notch or recess 28, the end 24 of the stop arm 22 will lie in the path of the arm 25 of the governor 17, and in this way will prevent the rotation of the governor shaft 18 which, being geared to the spring motor, will act to prevent the operation of such motor. When the end 29 of the arm 30 coöperates with the periphery of the disk 27, the end 24 of the arm 22 will lie out of the path of the arm 25 on the governor shaft 18, and in this way permit the operation of the motor to drive the shaft 3 of the film winding key 2.

The controlling disk or member 27 is operated in one direction by the motor, and for this purpose its shaft 31 carries a gear wheel 32 which is adapted to mesh with a one-tooth pinion 33 on the shaft 34. The shaft 34 has a pinion 35 on its inner end which meshes with the gear 20 so that upon the operation of the spring motor the gear 32 will be rotated by the one-tooth pinion 33. In order that the single tooth of the pinion 33 will not lie in engagement with the gear 32 while the motor is at rest, the shaft 34 is provided with a notched disk 36, the periphery of which coöperates with the end 37 of an arm 38 which extends from the shaft 23. The notch of this disk is so positioned that the end 24 of the stop arm 22 cannot move into coöperation with the governor arm 25, while the single tooth of the pinion 33 is engaged with the gear wheel 32. The spring pressed pawl 39 pivoted at 40 on the frame of the machine coöperates with the teeth of the gear wheel 32 to hold the latter in a position to which it is shifted by the one-tooth pinion 33. The movement of the controller member 27 in a direction opposite to the direction in which it is moved by the spring motor is effected by a volute spring 41; and a rocking movement of the controller together with the gear 32 is effected in a manner hereinafter set forth.

For the purpose of setting the controller member 27, the latter and the gear wheel 32 with their common shaft 31 are mounted on a swinging frame 42, pivoted at 43 on the main frame of the film winding mechanism. This swinging frame has a projecting portion 44 extending through a slot 45 in the plate 46 of the main frame, and engaged by a spring 47, which is anchored at 48 to the plate 46. This projection 44 is also engaged by an arm 49 on a rock shaft 50 journaled on the plate 46 of the main frame, and having an arm 51 which is adapted to be engaged by a manually operable plunger 52. A depression in this plunger, in the manner shown in Fig. 12, shifts the swinging frame 42 to carry the controller 27 away from the end 29 of the arm 30, and also to carry the gear wheel 32 away from its retaining pawl 39 and its driving gear or pinion 33. When the gear 32 passes away from its retaining pawl 39, the spring 41 comes into action, and shifts the gear 32 with the controller 27 in the direction opposite to that which these parts have been turned by the spring motor. Upon the release of the plunger 52, the spring 47 returns the gear 32 into coöperation with its retaining pawl 39 and at the same time the periphery of the controller 27 is brought into engagement with the end 29 of the arm 30, thus causing said arm to be moved to turn the shaft 23, thereby bringing the end 24 of the stop arm 22 out of the path of the arm 25 on the governor. This operation permits the rotation of the spring motor in order to shift the film the required distance and at the same time to turn the gear 33 until such time that the notch 28 is brought opposite the end 29 of the arm 30, when said end 29 will enter the notch, thus, provided the notch in the disk 36 is in proper relation to the end 37 of the arm 38, causing the stopping of the spring motor.

It is apparent that, owing to the fact that the film as it winds on the spool increases in diameter, the amount of turning of the film winding key must be varied to compensate for this difference in the diameter of the film on the spool. Normally the controlling member 27 rotates under the action of the spring 41 until an abutment or stop 53 on said controlling member coöperates with the stop 54 on the swinging frame 42. Associated with the stop 54 is a stop member 55 which is mounted to turn about an axis 56 on the swinging frame 42. A spring 57 tends normally to hold said stop member in one position. This stop member is provided with a projecting part 55$^a$ having a series of stop surfaces 58 which, in the initial position of the film winding mechanism, lie out of the path of the projection 53 to permit said projection to coöperate with the stop 54 on the first operation of the film winding mechanism after the latter has been set for a new film. On the successive operations of the film winding mechanism, the successive stops 58 are brought into coöperation with the stop 53, thus gradually shortening the return movement of the controller 27 under the action of its spring 41, so that the gear 32 has a smaller turning movement on the successive operations of the motor, the film winding key being turned accordingly.

For automatically shifting the stops 58 successively into stopping position, the stop member 55 has a toothed periphery 59 with which two spring-pressed pawls 60 and 61 coöperate. The pawl 60 is pivoted at 62 to the plate 46$^a$ of the main frame, while the pawl 61 is pivoted at 63 to the swinging frame 42. With this arrangement, when the swinging frame is moved toward the pawl 60 under the action of the plunger 52, said pawl 60 coöperates with the teeth 59 and turns the stop member 55 one tooth, in which position said stop member 55 will be held by the pawl 61, until such a time that the pawl 61 shall coöperate with the mutilated portion 64 of the stop member 55, when no further turning of the stop member will take place, due to the fact that the pawl 61 cannot hold the member 55 in any position beyond the mutilated portion.

To the end that the stop member 55 may be returned to its initial position, under the action of the spring 57, the pawls 60 and 61 are movable out of engagement with the teeth 59. This movement, in this instance, is effected through the removal of the back 65 of the camera, said back having a plate 66 secured thereto and extended beyond one side of the camera casing to coöperate with the arm 67 formed on a rock shaft 68, this rock shaft also having another arm 69 with which a spring 70 coöperates, for the purpose of maintaining the arm 67 against the extension of the plate 66, the arm moving under the spring 70 to turn the rock shaft 68 when the camera back is removed. The arm 69 has a portion operating in a slot 71 formed in the slide 72, which is guided at 73 and 73$^a$ on the swinging frame 42. This slide 72 controls the two pawls 60 and 61, and to this end engages a pin or projection 74 on the pawl 60 to move said pawl against the action of its spring 75, in order to carry the pawl out of engagement with the teeth 59 of the stop member 55. The slide 72 also has a projection 76 which coöperates with the projection 77 on the pawl 61 to move said pawl against the action of its springs 78 in order to carry the pawl out of engagement with the teeth 59 of the stop member 55. When both of the pawls have been moved out of engagement with the stop member 55, due to the removal of the camera back, the stop member 55 will turn under the action of its spring 57 until such a time that the projection 79 on the stop member shall coöperate with the pawl 61 in the manner shown in Fig. 10. When the camera back is again placed in position on the camera, the rock shaft 68 will be turned to shift the slide 72 in order to permit the springs of the pawls 60 and 61 to throw such pawls into coöperative relation with the teeth 59 of the stop member 55.

The winding of the spring motor may be effected by a finger piece 80 on the spring shaft 81, and also situated on this shaft is a ratchet 82 with which the spring pressed pawl 83 coöperates to hold the spring shaft in its adjusted position. The film winding mechanism is inclosed within a casing 84 having a removable cover plate 85, the base plate 46$^b$ of the supporting frame being secured to one side of the camera. The casing 84 may have a seat 89 for the bulb 90 which by a tube 91 connects with a shutter 92 of any suitable construction to effect the opening and the closing of the shutter by pressure on the bulb. An extension 93 on the plunger 52 engages the bulb to compress the same when the plunger is pushed.

The operation of the invention will be understood from the foregoing description, but it may be summarized as follows: The motor is wound through the finger piece 80 and the film is introduced into the camera in the usual manner through the manipulation of the winding key 2, the clutch connection 16 permitting a turning of the key shaft independently of the gear 13. To make an exposure the plunger 52 is depressed, causing the bulb 90 of the shutter to be pressed to actuate the shutter to effect the exposure; at the same time, the swinging frame 42 is shifted in order to carry the controller 27 away from the lever end 29, thus permitting the controller to rotate in order to bring its stops 53 into coöperation with the stop 54. The stop member 55 is also rotated by the pawl 60 to bring one of the stop faces 58 into position for limiting the controller 27 on the next action of the latter. With the release of the plunger 52 the swinging frame 42 will return to its original position and the controller 27 will engage the end 29 of the arm 30 to turn the shaft 23 so that the end 24 of the arm 22 will free the governor shaft 18 and permit the spring motor to operate and turn the stem of the winding key 2. This operation will continue until such time that the end 29 enters the notch 28 in the controller 27 and the end 37 of the arm 38 enters into the notch in the disk 36, when the end 24 of the arm 22 will pass into the path of the arm 25 on the governor shaft 18. On successive operations of the plunger 52 the stop member 55 continues its rotation under the action of the pawl 60, each time shortening the movement of the controller member 27 until the mutilated portion 64 is reached by the pawl 61. This will indicate to the user of the camera that the last film has been used and the film spool is then manipulated through the film winding key to wind the remaining portion of the backing sheet on the spool. The camera back is then opened, and this releases the rock shaft 68 of the spring 70, permitting the slide 72 to shift the pawls 60 and 61 out of connection with the stop member 55, whereby the stop member is permitted to rotate to its initial position bringing the stop device 79 against the pawl 61, this movement of the stop member taking place under the action of the spring 57. When the camera back is again placed on the camera with a new film in position, the film winding mechanism is ready for operation.

What I claim as my invention and desire to secure by Letters Patent is:—

1. A film winding mechanism comprising a motor for driving the film, a stop for the motor, and means operated by the motor during the winding of the film for effecting the operation of the stop to stop the motor, said means having a provision, independent of the stop, for varying the action of the motor to correspond with the amount of film wound on the spool of the film winding mechanism.

2. A film winding mechanism comprising a driving motor, a stop for the motor, a controller for the stop movable under the action of the motor during the winding of the film to hold the stop out of coöperation with the motor for a definite time, and means, independent of the stop, for varying the duration of the time of movement of the controller to correspond with the amount of film on the spool of the film winding mechanism.

3. A film winding mechanism comprising a driving motor, a stop for the motor, a rotary controller for said stop, said controller being movable to cause the stop to release the motor, a spring for rotating the controller after such movement of the said controller, and a connection between the controller and the motor for rotating the controller to tension the spring and to cause the stop to enter into stopping relation with the motor.

4. A film winding mechanism comprising a driving motor, a stop for the motor, a manually releasable controller for the stop, a spring for shifting said controller in one direction, and a connection between the controller and the motor for causing the latter to shift the controller in the other direction.

5. A film winding mechanism comprising a driving motor, a stop for holding said motor against action, a controller for holding said stop out of detaining relation with said motor for a definite time after such stop releases said motor, said controller being movable to cause the stop to release the motor, and a connection between the controller and the motor for causing the latter to move the controller to permit the stop to enter into detaining relation with the motor.

6. A film winding mechanism comprising a driving motor, a stop for the motor, a rotary controller for the stop, a spring for moving said controller in one direction, means for shifting said controller to cause the stop to release the motor and to permit the spring to turn the controller, and a connection between the controller and the motor for causing the controller to operate against the action of its spring in order to effect the operation of the stop into stopping relation with the motor.

7. A film winding mechanism comprising a driving motor, a stop for the motor, a rotary controller for the stop, a spring for moving said controller in one diection, a driving connection between the motor and the controller for moving the controller against the action of the spring, and means for shifting said controller to cause the stop to release the motor and the motor to become temporarily disconnected from the controller in order that the spring may act on the controller.

8. A film winding mechanism comprising a driving motor, a main frame on which the motor is mounted, a stop for the motor, a rotary controller for the stop, a frame on which the rotary controller is mounted, said frame being movable to cause the stop to release the motor, a spring acting on the controller upon the movement of said frame, and a driving connection between the controller and the motor embodying a gear on the movable frame and a gear on the main frame, said gears being disconnected when the movable frame is shifted to cause the stop to release the motor.

9. A film winding mechanism comprising a driving motor, a stop for the motor, a controller for the stop, a spring for moving said controller in one direction, driving connection between the motor and the controller for moving the controller in the other direction, and variable stopping means for coöperation with the controller to change the movement of the latter under the action of the spring.

10. A film winding mechanism comprising a driving motor, a stop for the motor, a controller for effecting the starting and the stopping of the motor through said stop, a driving conection between the controller and the motor for moving the controller in one direction, said driving connection having provision to release said controller for movement in the other direction, and a spring for moving the controller in the other direction, and variable stopping means for coöperating with the controller to determine its movement under the action of the spring.

11. A film winding mechanism comprising a driving motor, a stop for the motor, a controller acting through said stop to start and to stop the motor, a driving connection between the motor and the controller to move the controller in one direction, said driving connection having provision permitting the movement of the controller in the other direction independently of the motor, a spring for moving said controller in the other direction, and automatically shifting means for coöperating with the controller to vary the movement of such controller under the action of the spring.

12. A film winding mechanism comprising a driving motor, a stop for the motor, a controller for the stop movable under the action of the motor during the winding of the film to cause the stop to stop the motor at a certain time, and automatically shifting stopping means, independent of the stop of the motor, coöperating with the controller to vary the duration of the time of movement of the controller on successive operations of the motor.

13. In a roll film camera having a movable back to introduce the film, a film winding mechanism comprising a motor for driving the film, a stop for the motor, a controller for the stop having means associated therewith to decrease, on successive operations of the stop, the time during which the stop is held out of detaining relation with the motor, and a connection between the movable camera back and said means for resetting said means on the movement of the camera back in introducing a new film in the camera.

14. A film winding mechanism comprising a motor, for driving the film, a stop for the motor, a controller for the stop having means associated therewith for varying the action of the motor to correspond with the amount of film wound on the spool of the film winding mechanism, and means for resetting such means.

15. In a roll film camera having a movable back to introduce the film, a film winding mechanism comprising a motor, a stop for the motor, a controller for the stop, a spring for shifting said controller in one direction, a connection between the controller and the motor for causing the latter to shift the controller in the other direction, said connection having provision permitting the controller to move under the action of the spring, means associated with the controller to decrease, on successive operations of the motor, the time during which the stop is held out of detaining relation with the motor, and a connection between the movable camera back and said means for resetting said means on the movement of the camera back in introducing a new film in the camera.

16. A film winding mechanism comprising a motor for driving the film, a stop for the motor, a controller for the stop, a connection between the controller and the motor for causing the latter to shift the controller in one direction, said connection having provision to permit the controller to move in the other direction, a spring for shifting said controller in said other direction, and means associated with the controller to decrease on successive operations of the motor the time during which the stop is held out of detaining relation with the motor.

17. A film winding mechanism comprising a motor for driving the film, a stop for the motor, a controller for the stop, a connection between the controller and the motor for causing the latter to shift the controller in one direction, said connection having provision for permitting the controller to move in the other direction, a spring for shifting said controller in the other direction, an automatically shifting stopping means for coöperating with the controller to decrease, on successive operations of said motor, the time during which the stop is held out of detaining relation with the motor, and means for resetting said stopping means to its initial position.

18. A film winding mechanism comprising a motor for driving the film, a stop for the motor, a controller for the stop, a connection between the controller and the motor for causing the latter to shift the controller in one direction, said connection having provision permitting the controller to move in the other direction, a spring for moving said controller in the other direction, a rotary stop member having a plurality of stops thereon for coöperation with the controller to limit the movement of the latter under the action of the spring, step-by-step feeding devices for said rotary stop member, said feeding devices being movable to release the stop member to permit the latter to return to its initial position, and a spring for moving said stop member to its initial position.

FRANK F. PULVER.

Copies of this patent may be obtained for five cents each, by addressing the "Commissioner of Patents, Washington, D. C."